United States Patent [19]

Acampora et al.

[11] Patent Number: 4,914,648
[45] Date of Patent: Apr. 3, 1990

[54] MULTICHANNEL, MULTIHOP LIGHTWAVE COMMUNICATION SYSTEM

[75] Inventors: Anthony Acampora, Freehold; Michael G. Hluchyj, Little Silver; Mark J. Karol, Fair Haven, all of N.J.

[73] Assignees: American Telephone and Telegraph Company, New York, N.Y.; AT&T Bell Laboratories, Murray Hill, N.J.

[21] Appl. No.: 331,036

[22] Filed: Mar. 29, 1989

Related U.S. Application Data

[63] Continuation of Ser. No. 30,395, Mar. 26, 1987, abandoned.

[51] Int. Cl.$^4$ .............................................. H04B 9/00
[52] U.S. Cl. .................................... 370/3; 370/124; 455/606; 455/607; 455/612; 455/617
[58] Field of Search .................... 370/65, 67, 94, 3, 4, 370/88, 124; 455/601, 606, 607, 612, 617

[56] References Cited

U.S. PATENT DOCUMENTS

| | | | |
|---|---|---|---|
| 3,731,002 | 5/1973 | Pierce | 370/88 |
| 3,742,144 | 6/1973 | Brandenburg | 370/88 |
| 4,121,217 | 10/1978 | Chen | 370/1 |
| 4,232,385 | 11/1980 | Hara et al. | 370/3 |
| 4,434,463 | 2/1984 | Quinquis | 370/88 |
| 4,449,247 | 5/1984 | Waschka | 455/601 |
| 4,491,983 | 1/1985 | Pinnon et al. | 455/603 |
| 4,543,666 | 9/1985 | Witte | 455/607 |
| 4,592,043 | 5/1986 | Williams | 370/3 |
| 4,601,027 | 7/1986 | Scarr et al. | 370/3 |
| 4,630,256 | 12/1986 | Albanese | 370/3 |
| 4,686,667 | 8/1987 | Ohnsorge | 370/4 |
| 4,701,904 | 10/1987 | Darcie | 455/607 |
| 4,730,301 | 3/1988 | McMahon | 370/2 |
| 4,731,878 | 3/1988 | Vaidya | 455/600 |
| 4,731,880 | 3/1988 | Ault | 455/607 |
| 4,736,462 | 5/1988 | Joel | 455/600 |
| 4,736,463 | 5/1988 | Chavez | 455/607 |
| 4,736,465 | 5/1988 | Bobey et al. | 455/601 |

FOREIGN PATENT DOCUMENTS

| | | | |
|---|---|---|---|
| 0173508 | 3/1986 | European Pat. Off. | 455/612 |
| 2073407 | 10/1981 | United Kingdom | 455/607 |

OTHER PUBLICATIONS

Stone, *IEEE Trans. on Computers*, vol. C-20, No. 2, Feb. 1971, pp. 153-161.
Maxemchuk, *AT&T Technical Journal*, vol. 64, No. 7, Sep., 1985, pp. 1659-1685.
Chlamtac et al., *Infocom '87*, San Francisco, Calif., pp. 1102-1108.
Kinsel, Proc. IEEE, vol. 58, No. 10, Oct. 1970, pp. 1666-1692.
DeLange, Proc. IEEE vol. 58 No. 10, Oct. 1970, pp. 1683-1690.
DeBosio et al., IEEE Jrnl SAC, vol. SAC-3, No. 6, Nov. 1985, pp. 835-841.
Patir et al., IEEE Jrnl. SAC, vol. SAC-3, No. 6, Nov. 1985, pp. 872-881.
Sano et al., Electron. & Comm. Japan, Part 1, vol. 69, No. 6, 1986, pp. 42-53.

*Primary Examiner*—Robert L. Griffin
*Assistant Examiner*—L. Van Beek
*Attorney, Agent, or Firm*—Erwin W. Pfeifle

[57] ABSTRACT

The present invention relates to a multichannel multihop lightwave communication network which allows packet concurrency in the network while avoiding the need for agile optical devices. The network comprises a lightwave communication medium (10) for supporting a plurality of independent user nodes; and a plurality of N network interface units (NIUs) (11). Each NIU is connected to the lightwave medium and one or more separate user nodes and comprises a trnasmitter section (28-35) and a receiver section (20-27) which are each fixedly assigned to transmit and receive, respectively, over a single channel or a plurality of separate channels to or from other NIUs of the network. In a connectivity pattern for one embodiment of the network, the NIUs are divided into k groups of $p^k$ NIUs such that each NIU of a first group of $p^k$ NIUs is capable of transmitting over the fixedly assigned single channel, or any or all of the p separate channels, to a preferred one or all of the associated p separate NIUs of a second group, etc. based on a generalization of a perfect shuffle pattern. Such technique permits all NIUs of the network to communicate with all other NIUs either via a single hop or via multiple hops where NIUs in subsequent groups of $p^k$ NIUs act as intermediate retransmission units.

11 Claims, 9 Drawing Sheets

FIG.1

SEPARATE WDM CHANNELS

1 TRANSMITTER, 3 RECEIVERS PER USER
(T=1, R=3)

FIG. 10

3 TRANSMITTER, 1 RECEIVERS PER USER
(T=3, R=1)

FIG. 11

UP LINK DIRECTION

DOWN LINK DIRECTION

MULTICHANNEL, MULTIHOP LIGHTWAVE COMMUNICATION SYSTEM

This application is a continuation of application Ser. No. 030,395, filed on Mar. 26, 1987, now abandoned.

TECHNICAL FIELD

The present invention relates to a multichannel, multihop, lightwave communications network which allows a plurality of user data packets to concurrently reside within the network while avoiding the need for agile optical components.

DESCRIPTION OF THE PRIOR ART

For long distance point-to-point communications, lightwave has emerged as the technology of choice. When applied to multiuser local systems, lightwave technology has the potential for enormous bandwidth for each end user, coupled with the corresponding opportunity to offer revolutionary new user services and capabilities based on an abundance of inexpensive bandwidth. However, the reality of lightwave networks is somewhat at variance with this potential. Compared with twisted pair, coaxial cable, or radio based networks with active electronic circuitry, lightwave is a relatively immature technology.

Simple operations requiring active components, such as linear amplification, precise control of the instantaneous frequency of a user's laser, and routing of optical signals among a multitude of users, as would be needed to develop the full potential of lightwave networks, await technological breakthroughs. Furthermore, although the lightwave transmission medium possesses a bandwidth which might be measured in the tens of terahertz range, the ability of any particular user to access the bandwidth, to either receive or transmit, through a single user port on the network is limited by the rate at which light may be electro-optically modulated or demodulated, a rate limited to the range of several gigabits/sec.

Time and frequency (or wavelength) division multiplexing are the two most common methods for sharing a communications channel among multiple users. In this regard see, for example, the Part I and Part II articles by T. S. Kinsel and O. E. DeLange relating to time division multiplexing and frequency division multiplexing, respectively, for wide-band optical communication systems in *Proceedings of the IEEE*, Vol. 58, No. 10, October 1970, at respective pages 1666–1682 and 1683–1690.

Concurrency requires that the multiple transmissions resident in the network remain distinguishable as they are routed by the network so that they may be identified, as appropriate, by the user receivers. One possible approach for maintaining distinguishability in a lightwave network is via Wavelength-Division Multiplexing (WDM) wherein each of the two end users associated with a given transmission are assigned a unique wavelength, distinct from all other concurrent transmissions, for the duration of that message's transmission. This approach suffers from two distinct drawbacks. First, to provide complete interconnectivity among all users, to allow any user to communicate with any other user, requires that either all user transmitters or all user receivers, or both, be able to tune to any of the wavelength channels created within the network. Fast wavelength agility, or the ability to accurately tune optical transmitters or receivers on a time scale which is short compared with the duration of information packets flowing in the network, would ultimately be needed for a WDM network. Second, since a given receiver could listen to but one channel at any given moment, a WDM network is inherently non-broadcast, and some reservation technique must be used, such that the appropriate transmitter/receiver pair for each message be commanded to the same channel for the same time interval. Thus, tight dynamic coordination among all users is required, implying the need for a centralized or distributed network controller or scheduler. Similar requirements are needed for a time-division multiplexing lightwave network.

The basic problem associated with the conventional approaches to providing concurrency is that each transmitting node be instantaneously connected to the corresponding receiving node. The current state of the art of lightwave technology cannot provide the dynamic agility needed to appropriately interconnect user pairs. Therefore, the problem in the prior art is to provide a lightwave network which achieves concurrency of multiple transmissions between network user pairs while avoiding the need for dynamic agility.

SUMMARY OF THE INVENTION

The foregoing problem in the prior art has been solved in accordance with the present invention which relates to a multichannel, multihop, lightwave communications network which allows a plurality of user data packets to concurrently propagate within the network while avoiding the need for agile optical components. More particularly, the present invention relates to a lightwave communication network comprising a lightwave communication medium for supporting a plurality of independent user nodes; and a plurality of N network interface units (NIU), each NIU being connected to the lightwave communication medium and one or more separate user nodes of the network and comprising one or more transmitters and receivers which are each separately fixedly assigned to transmit and receive, respectively, over a single communication channel. Communication channels and NIU transmitters and receivers are assigned such that at least one NIU can transmit to at least two other NIUs or receive from at least two other NIUs, and there is at least one NIU that cannot transmit directly via a communication channel to at least one other NIU.

Other and further aspects of the present invention will become apparent during the course of the following description and by reference to the accompanying drawings.

DETAILED DESCRIPTION

Figure 1:
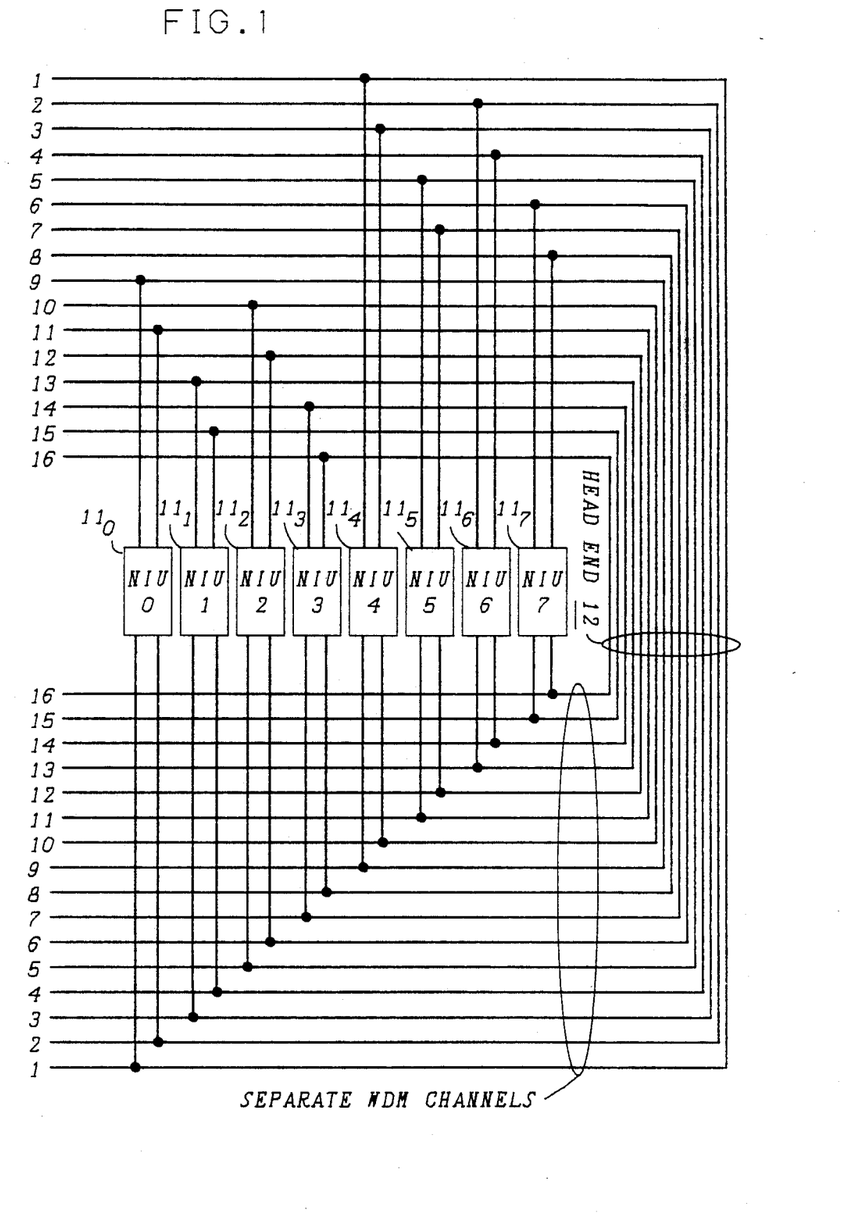
FIG. 1 is a block diagram of an exemplary arrangement of an 8-user multihop lightwave network in accordance with the present invention showing exemplary channel assignments.
Figure 2:
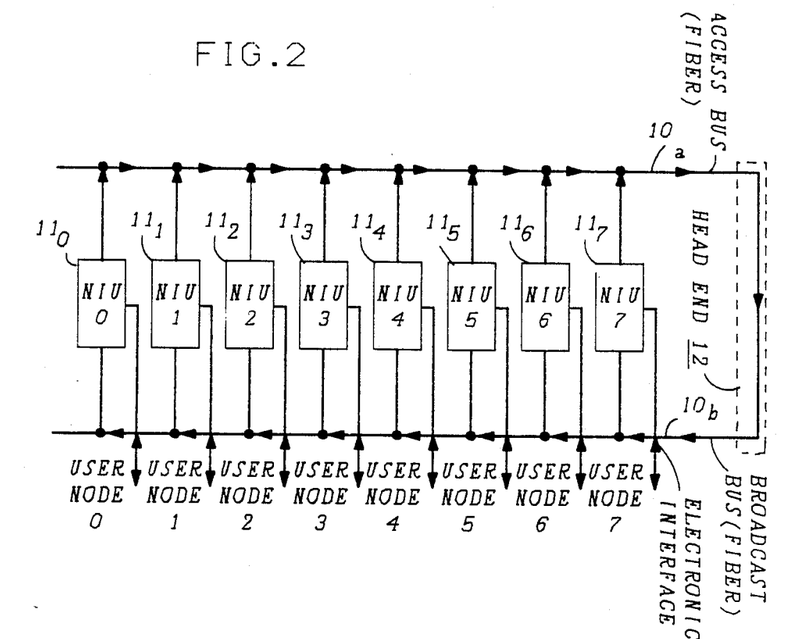
FIG. 2 is a block diagram of the unidirectional physical connections for the network of FIG. 1.
Figure 3:
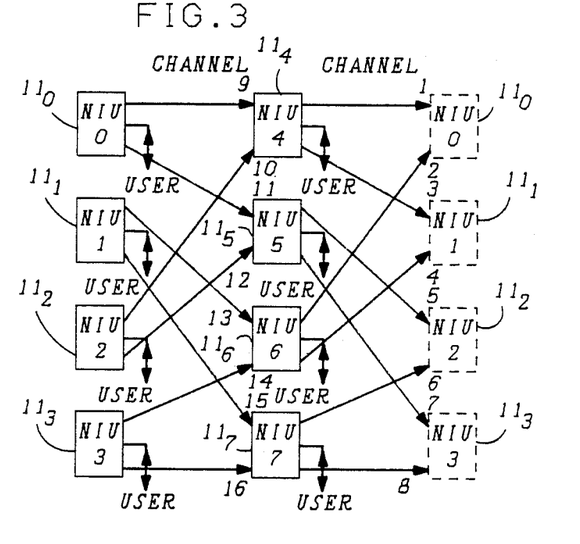
FIG. 3 is a connectivity graph for the network arrangement shown in FIG. 1 using a perfect shuffle interconnection pattern.

FIGS. 1–3 show an exemplary approach for the present multihop lightwave network, which for simplicity, is drawn for a bus topology. It is to be understood that this exemplary approach is merely being used for purposes of explanation and not for purposes of limitation and that such approach can be expanded to cover a broader aspect of the present invention by including other network topologies and component transmission and reception assignments as will be described hereinafter. In FIG. 2 the individual users, or individual group of users, in the network interface with two unidirectional lightwave busses $10_a$ and $10_b$, which are interconnected at a head end 12 and can be formed from a single lightguide, such as an optical fiber, or multiple lightguides via a sequence of Network Interface Units (NIUs) $11_0$ to $11_7$ which are distributed along the busses. All NIUs transmit onto the transmit bus $10_a$ which unidirectionally propagates all messages toward head end 12 where the optical lightguide forming the busses passively loops back for propagating the messages or packets over broadcast bus $10_b$ to NIUs $11_0$ to $11_7$.

Figure 4:
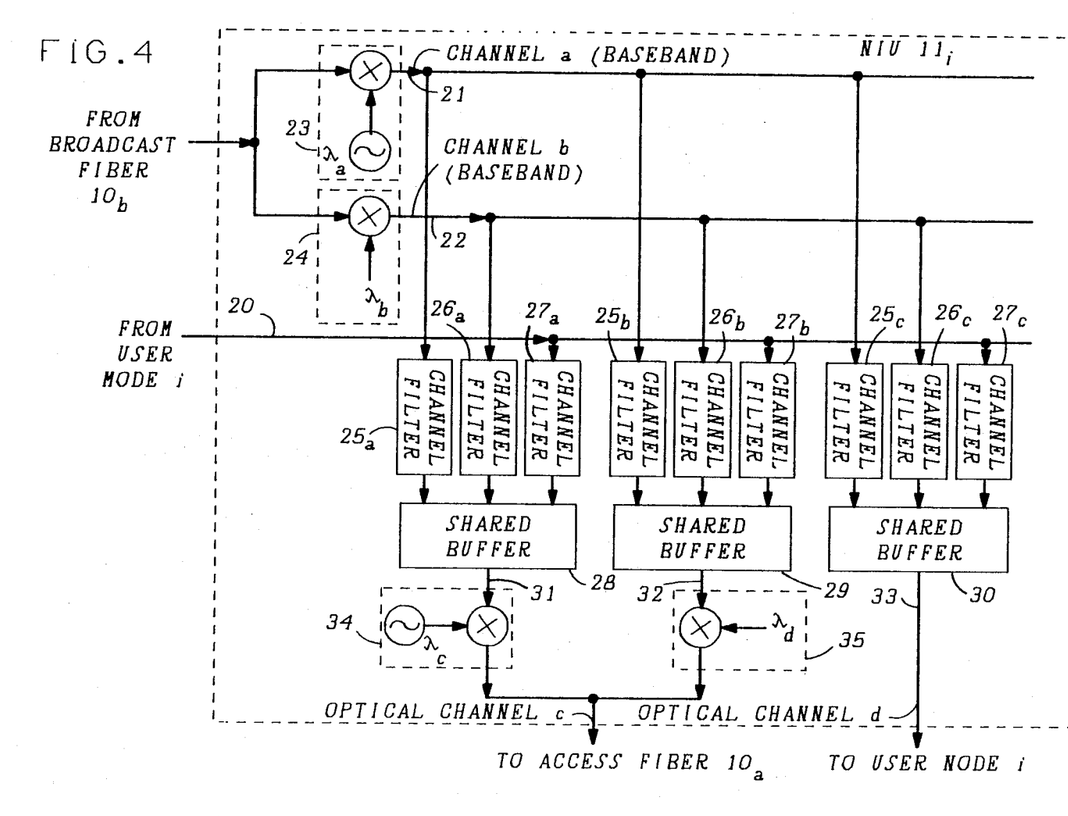
FIG. 4, is a block diagram of an exemplary Network Interface Unit 11 for use in the network of FIG. 1.

FIG. 1 depicts an exemplary network of FIG. 2 where, for example, sixteen Wavelength-Division-Multiplexed (WDM) channels are created within the single fiber bus $10_a$ and $10_b$. For purposes of explanation, it is assumed that the channels are spaced such that the modulated carriers on the various channels do not overlap and all carriers are distinct when modulated. Each NIU $11_i$ of this network is equipped with two laser transmitters which, for simplicity will be assumed as single mode lasers, although multimode lasers may also be used as long as the channels remain distinct. Each of the two optical transmitters in each NIU is permanently tuned to one of the sixteen WDM channels and may be modulated at a user node rate of, for example, 1 Gb/sec. With the two laser transmitters, each NIU can transmit only over two channels to which it has been assigned at the maximum rate of the exemplary 1 Gb/sec. Similarly, each NIU is equipped with two receivers, each of which is permanently tuned to receive one of the WDM channels at the exemplary channel rate of 1 Gb/sec. Channel selection, for example, may be performed either with two narrowband optical filters to select the appropriate two channels, or via coherent heterodyne detection where, the receivers would contain two single mode lasers with each laser tuned to receive the appropriate channel as shown in FIG. 4 and described in more detail hereinafter.

It is to be understood that the multihop network of FIG. 1 can also be used to describe a non-WDM, multihop, star network where the lines depicting the separate channels on busses $10_a$ and $10_b$ can be separate optical fibers which are patched at the head end to interconnect the appropriate NIU pairs. More particularly, the first and second transmitter of NIU $11_0$ would transmit over separate optical fibers shown as the lines for channels 9 and 11, respectively, which would be patched or connected at the head end to respective separate optical fibers indicated as channels 9 and 11 that are terminated in one of the two receivers of NIUs $11_4$ and $11_5$, respectively. The other NIUs would similarly be connected to separate optical fibers and terminated at a separate receiver of the associated NIU pairs. Therefore, the term channel hereinafter can designate either a separate WDM frequency band or a separate dedicated optical fiber. Moreover, the complete set of channels used in the network may be derived from the combination of WDM on multiple optical fibers.

From the exemplary eight NIUs with 16 WDM channels or dedicated fibers of FIG. 1, it is shown that no two transmitters transmit over the same channel and no two receivers listen to the same channel, and the channel assignments have been made such that only one receiver listens to each of the channels. For example, user node 0, employing NIU $11_0$, can only transmit over channels 9 and 11 which can only be received by NIU$_4$ and NIU $11_5$, respectively. More particularly, the optical channel assignment among NIU pairs takes the form of a re-circulating perfect shuffle interconnection pattern as shown in FIG. 3. Here, the NIUs are grouped into two columns with NIUs $11_0$ to $11_3$ disposed in the first column and NIUs $11_4$ to $11_7$ disposed in the second column. The right-hand side of each NIU block corresponds to the transmit direction, and the left-hand side corresponds to the receive direction. The interconnection between the transmitters of column 1 and the receivers of column 2 takes the form of a perfect shuffle pattern. Similarly, if column 1 is re-drawn to the right of column 2, the interconnection between the transmitters of column 2 and the receivers of column 1 also takes the form of a perfect shuffle.

The perfect shuffle pattern insures that, for such an exemplary eight user node network, every message can find its way to the correct destination by either a direct connection or by hopping along paths transversed by intermediate NIUs, and no message must be introduced to the network more than three times. For example, referring to either FIG. 1 or FIG. 3, suppose that user node 6 wishes to send a message or packet to user node 1. This message or packet will arrive at NIU $11_6$ via the electronic interface from user node 6 where it will be (a) electronically routed in NIU 6 to the transmitter feeding channel 4, and (b) then optically received by NIU $11_1$ from channel 4 and regenerated therein to produce an electrical signal which is transmitted via the electronic interface from NIU $11_1$ to user node 1. Similarly, if user node 0 wishes to send a message to user node 6, the message will arrive from user node 0 at NIU $11_0$ via the electronic interface where it will be (a) electronically routed to the transmitter feeding optical channel 11, (b) optically received and regenerated by NIU $11_5$, (c) electronically routed to the transmitter of NIU $11_5$ feeding optical channel 7, (d) optically received and regenerated by NIU $11_3$, (e) electronically routed to the transmitter of NIU $11_3$ feeding channel 14, and (f) optically received by NIU $11_6$ and regenerated to produce an electrical signal which is transmitted via the electronic interface to user node 6. The abovedescribed network, therefore, provides concurrency of signals from the user nodes and complete interconnectivity of all users of the network while avoiding optical components which require agility.

A block diagram of a representative NIU $11_i$ for a WDM network of FIGS. 1 and 2 is shown in FIG. 4. NIU $11_1$ is shown as including three inputs, with the first input being the electronic interface 20 from the associated user node i. The two remaining inputs 21 and 22 are optical, and correspond to the two WDM receive channels from bus $10_b$ to which NIU $11_i$ is permanently assigned. Since all optical channels from bus $10_b$ are available to the NIU, two filtering means are needed to select the appropriate two channels. This may be done by optical heterodyning, as shown in FIG. 4, where a first demodulator 23 and a second demodulator 24 each demodulate to baseband a separate one of the two dedicated channels associated with the NIU for further processing. Alternatively, fixed narrow band optical filtering and detecting means (not shown) may be used in place of demodulators 23 and 24 to pass the desired channels while discriminating against all others and producing the two desired electronic output signals.

The three electronic baseband signals arriving on inputs 20-22 are then distributed to a 3×3 fully interconnected electronic switching means which can take the form of three sets of three channel filters or selectors $25_a$–$27_a$ to $25_c$–$27_c$. The three filters or selectors associated with each output e.g., selectors $25_a$–$27_a$ associated with output 31, select those signals from each of the three inputs 20-22 intended for that particular output, and disregard the rest. More particularly, each of the channel filters or selectors $25_i$–$27_i$ include active electronics which, for example, looks at a header field in the received message or packet and compares this information with stored destination addresses to determine whether the message should preferably be transmitted via the associated output or not. Each of the three outputs 31-33 is served by a shared buffer 28-30, respectively, which stores arriving messages for a particular output on a first in first out basis. For the WDM network configuration of FIG. 1, outputs 31 and 32 drive optical modulators 34 and 35, respectively, to place the output signals on the appropriate channels of bus $10_a$. The third output 33 is an electronic interface which goes directly to the associated end user node. For the non-WDM configuration of FIG. 1 where separate optical fibers are used for each channel, inputs 21 and 22 would be directly connected to the associated optical receivers for the separate optical fibers of bus $10_b$, and outputs 31 and 32 would be directly connected to the optical transmitters for the separate dedicated fibers of bus $10_a$.

For a general re-circulating perfect shuffle network, the number of NIUs N can be shown to grow in accordance with the general equation $$N = kp^k, k=1,2, p=1,2,$$ (1)

where k is the number of columns in the connectivity graph into which the NIUs are grouped, and p is the number of separate channels used for transmission by each NIU. More generally, the connectivity graph arranges $N=kp^k$ NIUs in k columns of $p^k$ NIUs each as shown, for example, in FIG. 3, where k=2, p=2 and N=8. Additionally, the number of channels W needed for a network according to the network of FIG. 2 grows in accordance with $$W = kp^{k+1}, k=1,2,3,4$$ (2)

Figure 5:
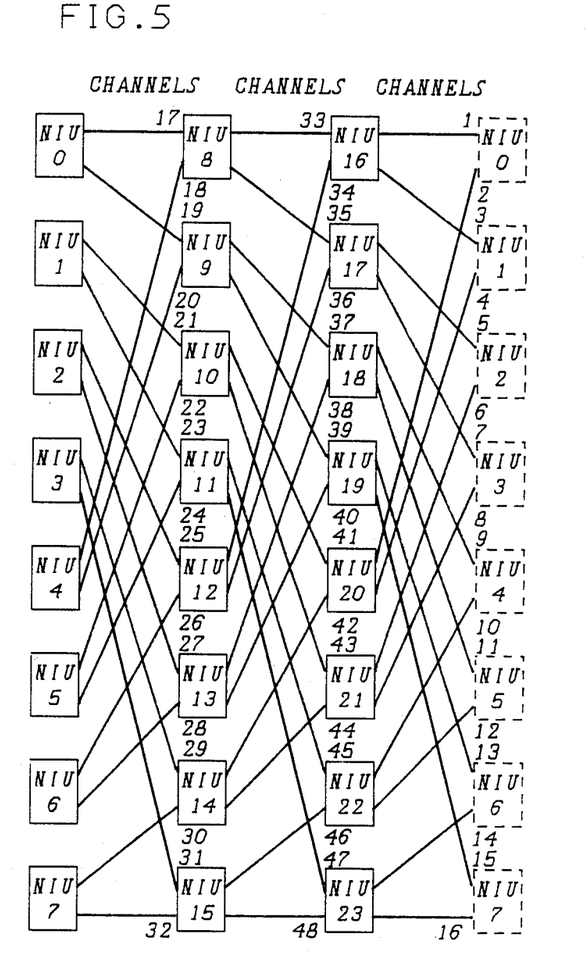
FIG. 5 is a connectivity graph for a 24-user network using a perfect shuffle interconnection pattern.

A typical example of a channel interconnection graph for a 24 user node network where k=3, p=2, N=24 and W=48 is shown in FIG. 5. From such example it becomes evident that for a large number of user nodes, a large number of channels would be needed.

In accordance with an aspect of the present invention, the number of channels needed may be significantly reduced. Rather than giving each transmitter a dedicated channel to one receiver, a given channel can be shared among several transmitters, and several receivers can be allowed to receive a particular channel. More specifically, FIG. 5 shows an interconnection pattern for a 24 user node network where k=3 in equation (1), and FIG. 6 modifies this pattern to sequentially number the receiving channels in each column from 1-16 as shown. With this pattern, NIUs 0, 8, and 16 all write onto channels 1 and 3. In effect, the number of WDM channels created in busses 10 of FIG. 1 by the pattern of FIG. 5 is substantially reduced from 48 to 16 channels in FIG. 6, and each channel is shared among three NIUs. Then, for example, if NIU 1 has a message which must be routed to NIU 10 on channel 5, and NIU 9 has a message which must be routed to NIU 18 on channel 5, then NIUs 1 and 9 must contend for the right to use channel 5 at that time using any known contention technique; the one denied transmission must defer to some later time.

Figure 6:
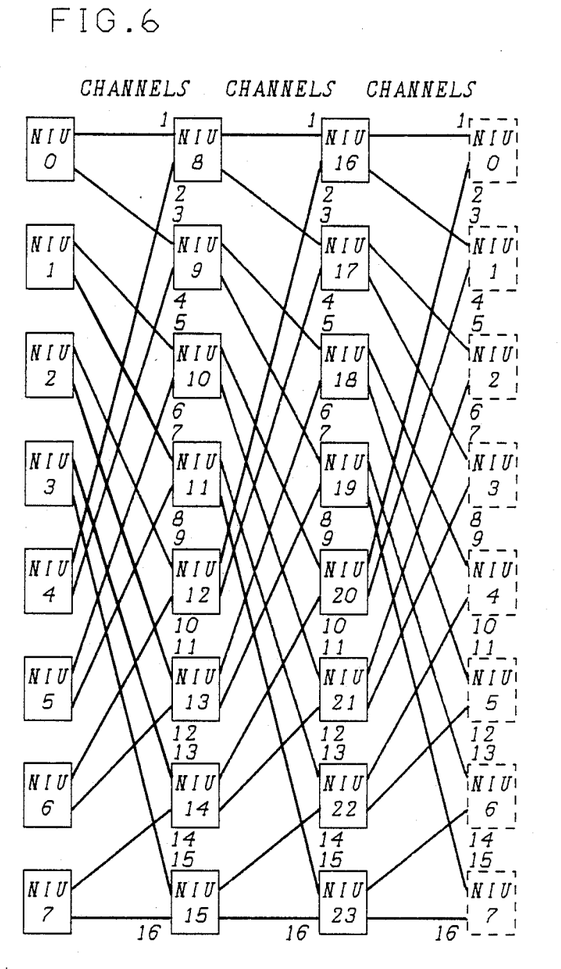
FIG. 6 is a connectivity graph for a 24-user re-circulating perfect shuffle interconnection pattern similar to FIG. 5 with channel assignments for shared channels.

Following the numbering scheme of FIG. 6, the number of shared channels F grows as $$F = p^{k+1}, k=2,3,4,$$ (3)

Thus, for a large network of, for example, k=7, p=2 where $N=kp^k=896$ user nodes, the number of WDM channels is substantially reduced from W=1792 channels to F=256. Since the number NIUs contending for a given channel is only k for the shared channel pattern of FIG. 6, which is much smaller than the number of NIUs, one strategy for discharging buffered packets is a fixed assignment Time Division Multiple Access (TDMA) scheme. There, time is divided into repetitive frames, each frame containing k time slots, and one of the k NIUs contending for a given channel is permanently assigned to one of the k time slots. If all buffers 28 and 29 of FIG. 4 in the NIUs are not empty, then no time on a channel will be lost due to the fixed TDMA assignment. Alternatively, efficient token bus access used in the past for single channel networks may be used for each of the WDM channels.

Figure 7:
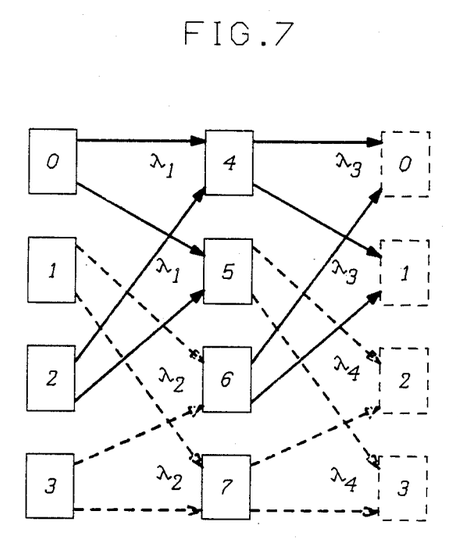
FIG. 7 is a connectivity graph for an 8-user (p=2, k=2) ShuffleNet similar to FIG. 3 with four shared channels.

Alternatively, rather than sharing channels along a row of NIUs, channels may be shared among NIUs in a column as illustrated in FIG. 7. In this manner, only one transmitter and one receiver are required for each NIU. Broadly stated, except for the p=1 configuration, the present perfect shuffle networks, hereinafter ShuffleNets, with only one transmitter and one receiver per NIU share WDM channels or lightguides among NIUs. Specifically, groups of p NIUs in each column of a connectivity graph transmit on a common channel, with a separate group of p NIUs in the next column receiving each channel. Hence, there are $p^{k-1}$ channels per column of NIUs, and $kp^{k-1}$ channels altogether in the network. For i=0,1, . . . ,p−1; NIUs i, i+$p^{k-1}$, $i+2p^{k-1}, \ldots,$ and $i+(k-1)p^{k-1}$ in a column transmit on a common channel that is received by NIUs $j, j+1, j+2, \ldots,$ and $j+p-1$ in the next column, where $j=(i \bmod p^{k-1})p$. FIG. 7 illustrates this for the 8-user $(p=2,k=2)$ ShuffleNet connectivity graph similar to FIG. 3. There, each of the NIU pairs (0,2), (1,3), (4,6), and (5,7) transmits on a different channel with each NIU using one transmitter and one receiver.

Figure 8:
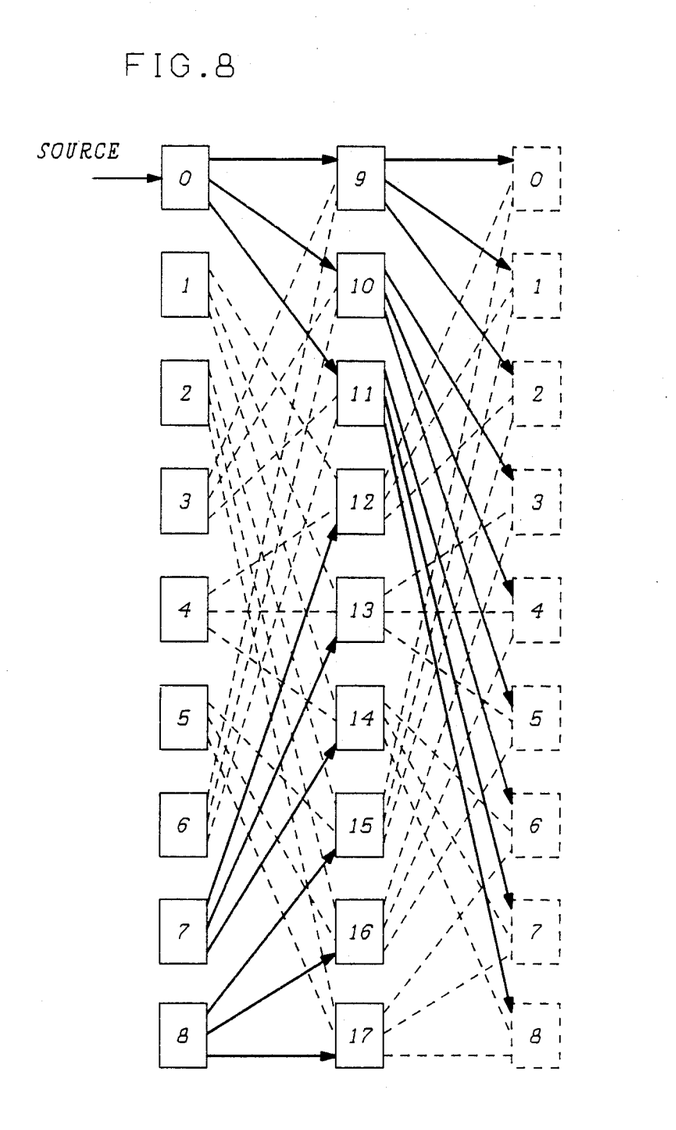
FIG. 8 is a connectivity graph for an 18-user (p=3, k=2) ShuffleNet showing a spanning tree arrangement for routing user packets.

The importance of ShuffleNet, as a multihop lightwave network, comes from its ability to efficiently utilize multiple WDM channels, under uniform traffic loads, with simple fixed routing procedures. FIG. 8 illustrates, for an 18-user $(p=3,k=2)$ ShuffleNet, a spanning tree that might be used to assign routes to packets generated by user 0 destined for other users in the network. If it were not for the path provided for routing packets from user 0 back to itself via user 9, the $k=2$ ShuffleNet arrangement would be identical to an ideal spanning tree configuration where for routing packets in a regular connectivity graph of degree p, the tree has the form of a p-ary tree. For routing in a ShuffleNet connectivity graph, addresses are assigned in a natural way with columns, c, numbered left to right from 0 to $k-1$, and rows, r, numbered top to bottom from 0 to $p^k-1$. Since WDM channels can be shared, with p NIUs listening to the same wavelength and receiving the same packets, the routing algorithm must specify which NIU should retransmit a received packet. Specifically, when a NIU receives a packet that is not destined to its associated user, it must determine whether it should retransmit the packet over its transmit channel, or just ignore the packet. Consider an arbitrary user in the network, and let that user's address be denoted by the coordinates $(\hat{c},\hat{r})$. The following routing decisions are made when NIU $(\hat{c},\hat{r})$ receives a packet with a destination address $(c^d,r^d)=[c^d,r^d(k-1)r^d(k-2)r^d(0)]$:

$$\text{If}(c^d,r^d)=(\hat{c},\hat{r}), \quad (1)$$

then (c,r) is the destination, and the packet is not repeated.

$$\text{If}(c^d,r^d)\neq(\hat{c},\hat{r}), \text{ then the packet is repeated if, and only if, } r^d((k+c^d-\hat{c})\bmod k)=\hat{r}(0). \quad (2)$$

Note that the routing decision is based only on one of the p-ary digits in the destination address of the received packet.

Figure 9:
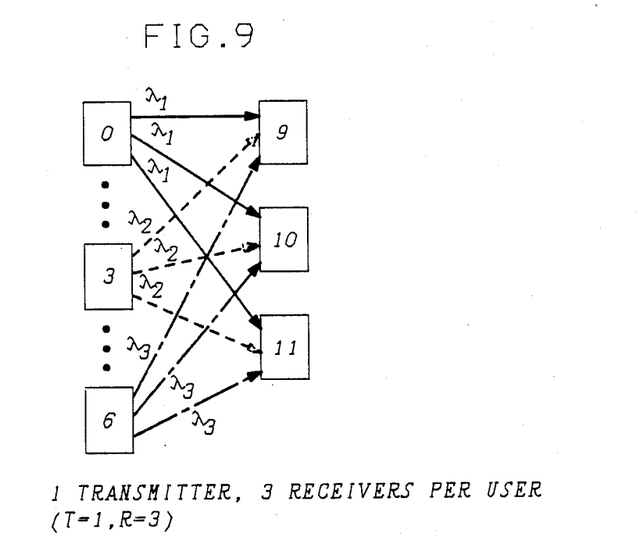
FIG. 9 is a partial connectivity graph for the network arrangement of FIG. 8 where 1 transmitter and 3 receivers per NIU are used.
Figure 10:
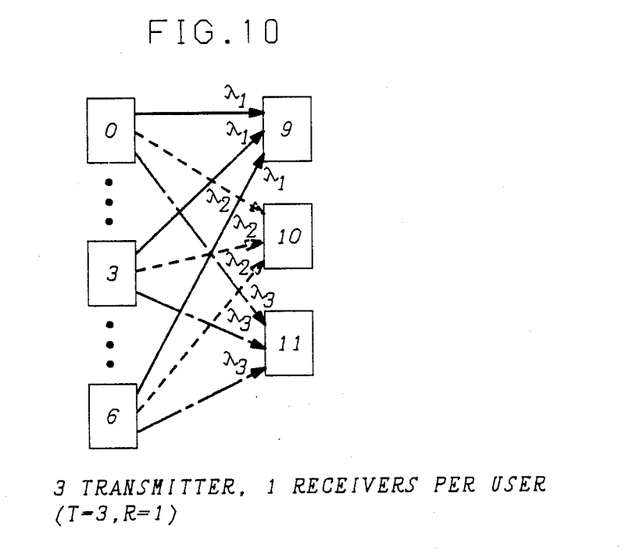
FIG. 10 is a partial connectivity graph for the network arrangement of FIG. 8 where 3 transmitters and 1 receiver per NIU are used.

One way to increase user throughput is to provide each NIU with multiple transmitters and receivers. For example, as shown in FIG. 8, if each NIU can have three transmitters (T=3) and three receivers (R=3), then a separate dedicated WDM channel is associated with each connective line. Alternatively, if T=1 and R=1 in FIG. 8, then the channels are shared by p=3 NIUs, and nine connective lines together constitute a single channel. For example, in FIG. 8 NIUs 0, 3, and 6 share common transmit wavelengths, while NIUs 9, 10 and 11 receive that same wavelength for T=1 and R=1. FIGS. 9 and 10 show two alternative arrangements for the same 18-user (p=3, k=2) ShuffleNet connectivity graph of FIG. 8, where in FIG. 9 T=1, R=3 and in FIG. 10 T=3, R=1. Given an arbitrary N-user (p,k) ShuffleNet connectivity graph, many values of T and R are possible.

ShuffleNet has two important properties that can be exploited to simplify the multiple access problem with shared channels. First, only a small fraction of the total user population contend for use of any given WDM channel. Second, the relative independence of a connectivity graph and the network physical topology provides the freedom to assign the transmit and receive wavelengths specified by ShuffleNet arbitrarily to specific NIUs. Channel sharing can be made easier by assigning the same transmit wavelength to a group of NIUs that are "geographically close", thereby reducing the propagation delay between NIUs sharing a common channel. Furthermore, the second property may permit a network design that only requires one transmitter per channel, rather than one transmitter per NIU.

Figure 11:
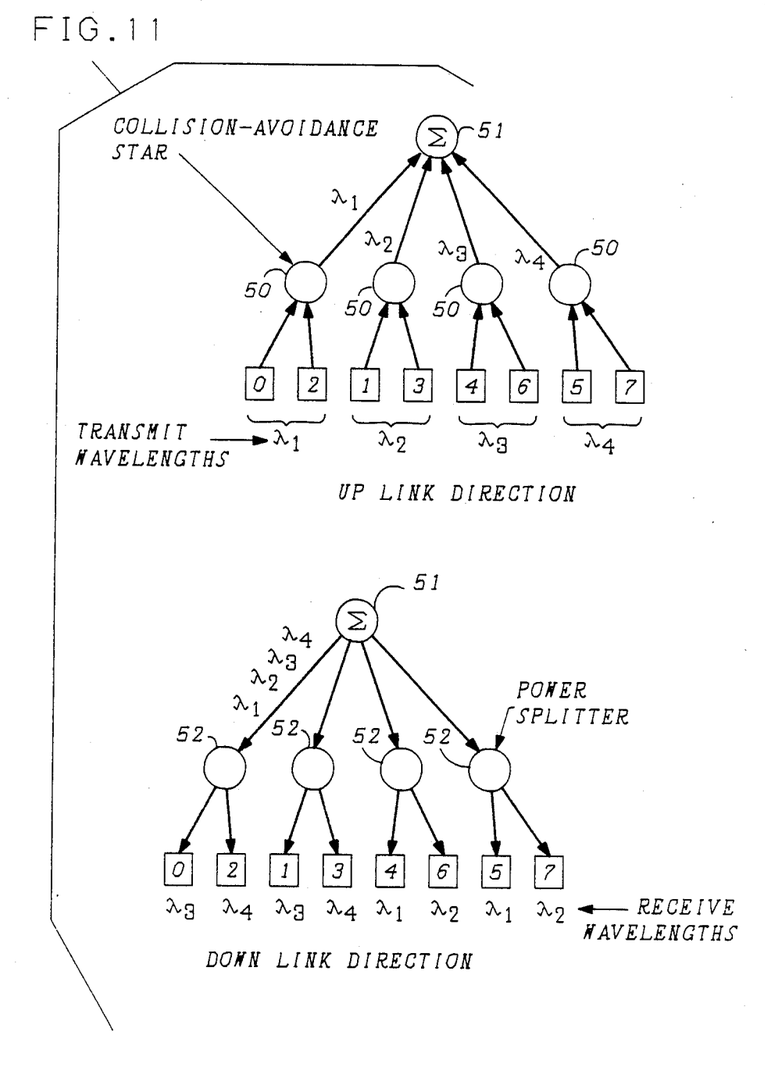
FIG. 11 is an exemplary physical topology for efficient channel sharing of a single transmitter, single receiver per user ShuffleNet with shared channels.

FIG. 11 illustrates a double-star configuration as one possible physical topology for the efficient channel sharing of a single transmitter, single receiver per user ShuffleNet for the connectivity graph of FIG. 7. For the 8-user ShuffleNet of FIG. 11, NIUs 0 and 2 are physically close and are arbitrarily assigned a transmit wavelength $\lambda_1$. NIUs 0 and 2, however, then receive packets on wavelengths $\lambda_3$ and $\lambda_4$, respectively, in accordance with the connectivity graph. In this configuration, the first packet to reach an idle collision-avoidance star 50 passes therethrough. When the collision-avoidance star 50 is busy, a packet that arrives from any other NIU is "blocked", and must be retransmitted by the NIU. Packets that make it through on different wavelengths are combined in a star coupler 51, and broadcast back down to all NIUs via power splitters 50. Power splitters 52 are used to divide the received signal and transmit the signals to the associated NIUs.

It is to be understood that the above-described embodiments are simply illustrative of the principles of the invention. Various other modifications and changes may be made by those skilled in the art and fall within the spirit and scope thereof. For example, although an NIU has been generally described as being associated with a single user node and having equal numbers of transmitters and receivers, an NIU may serve a plurality of m users and have i receivers and i transmitters so that the electronic switch within the NIU would comprise an (i+m)-by-(j+m) configuration. Furthermore, other connectivity graphs besides the recirculating perfect shuffle described hereinbefore are possible, where the number of incoming and outgoing links may vary from one NIU to another. Also, although the physical topology of a multihop network may be that of a bus, as shown in FIG. 2, other physical topologies are possible including stars, trees, rings and meshes.

What is claimed is:

1. A communication network for providing communications between a plurality of user nodes, the network comprising:

a communication media section (10) for supporting a plurality of communication channels therealong; and a plurality of N network interface units (NIUs)(11) where N>2, each NIU being coupled directly to the communication media section and to at least one user node of the network, the plurality of NIUs being arranged such that (a) at least one of the plurality of NIUs is arranged to transmit information directly over the communication media section via at least one communication channel to at least two other NIUs or to receive information over the media section from at least two other NIUs via at least one communication channel, and (b) at least one of the plurality of NIUs is not arranged to transmit information directly via a communication channel to a desired at least one of the other NIUs of the network and communicates with said desired at least one of the other NIUs by transmitting information to a second different NIU using a first communication channel and the second NIU then retransmits the information over the communication media section using a second different communication channel either directly, or via other NIUs and other communication channels, to the desired at least one of the other NIUs, each NIU comprising at least one transmitter and at least one receiver and the transmitters and receivers of the plurality of NIUs are subdivided into a plurality of k separate groups of $p^k$ NIUs per group, where p is a integer and $N=kp^k$, which groups are arranged in a predetermined sequence and interconnected in accordance with a recirculating generalized perfect shuffle pattern.

2. A communication network according to claim 1 wherein for NIUs arranged with a communication channel therebetween in a first direction of communication, at least one of the NIUs is not arranged with a communication channel therebetween in a second opposite direction.

3. A communication network for providing communications between a plurality of user nodes, the network comprising:
   a communication media section (10) for supporting a plurality of communication channels therealong; and
   a plurality of N network interface units (NIUs)(11), where N>2, each NIU being coupled directly to the communication media section and to at least one user node of the network, the plurality of NIUs being arranged such that (a) at least one of the plurality of NIUs is arranged to transmit information directly over the communication media section via at least one communication channel to at least two other NIUs and/or to receive information over the media section from at least two other NIUs via at least one communication channel, and (b) at least one of the plurality of NIUs is arranged not to transmit information directly via a communication channel to a desired at least one of the other NIUs of the network, but rather is connected to communicate with the desired at least one of the other NIUs by transmitting information to a second different NIU using a first communication channel, and the second NIU then connected to retransmit the information over the communication media section using a second different communication channel either directly, or via other NIUs and other communication channels, to the desired at least one of the other NIUs, each NIU comprising at least one transmitter and at least one receiver, and at least a portion of the plurality of NIUs capable of being subdivided to comprise k separate groups of $p^k$ NIUs per group, where p and k are integers, which groups are arranged in a predetermined sequence and interconnected in accordance with a recirculating generalized perfect shuffle pattern.

4. A communication network according to claim 3 wherein for NIUs arranged with a communication channel therebetween in a first direction of communication, at least one of the NIUs is not arranged with a communication channel therebetween in a second opposite direction.

5. A method of providing communications between a plurality of N network interface (NIUs) along a communication media section that supports a plurality of communication channels in a communication network, where (1)N>2, (2) each NIU comprises at least one transmitter at least one receiver, and (3) at least a portion of the plurality of NIUs may be divided to comprise k separate groups of $p^k$ NIUs per group, where n and p are integers, which groups are arranged in a predetermined sequence and interconnected in accordance with a recirculating generalized perfect shuffle pattern such that at least one of the plurality of NIUs is connected to transmit information directly over the communication media section to at least two other NIUs and/or receive information over the media section from at least two other NIUs via at least one communication channel, and at least one of the plurality of NIUs is arranged not to transmit information directly over the media section to a desired at least one of the other NIUs, the method comprising the steps of:
   (a) transmitting information from a first NIU directly over the communication media section via at least one communication channel to at least two other second NIUs of the network;
   (b) a second NIU receiving the information from the first NIU in step (a), determining from the received information if the information is destined for the receiving second NIU, and if the information is destined for the second receiving NIU, transmitting said information to a user coupled to the second receiving NIU, and if the information is not destined for the second receiving NIU, retransmitting said information over the communication media section via at least one second different channel either directly, or via other third NIUs and other communication channels, to the destined NIU.

6. The method according to claim 5 wherein the communication media section comprises at least one lightguide, and the information is transmitted in steps (a) and (b) using lightwave signals.

7. The method according to claim 5 wherein the communication channels in steps (a) and (b) are wavelength division multiplexed channels within the frequency spectrum of the communication media section.

8. The method according to claim 5 wherein the communication channels in steps (a) and (b) are dedicated wires or lightguides for providing point-to-point communication between the interconnected NIUs.

9. A communication network according to claim 1, 2, 3 or 4 wherein the communication media section is capable of propagating lightwave signals.

10. A communication network according to claim 9 wherein the communication channels are wavelength division multiplexed within the frequency spectrum of the communication media section.

11. A communication network according to claim 9 wherein the communication channels are directed through separate dedicated lightguides between communicating NIU pairs.

* * * * *